(12) United States Patent
Lu et al.

(10) Patent No.: US 8,465,677 B2
(45) Date of Patent: Jun. 18, 2013

(54) ELECTRICALLY CONDUCTIVE COMPOSITION AND FABRICATION METHOD THEREOF

(75) Inventors: Chun-An Lu, Taipei (TW); Hong-Ching Lin, Kaohsiung (TW)

(73) Assignee: Industrial Technology Research Institute, Hsinchu County (TW)

( * ) Notice: Subject to any disclaimer, the term of this patent is extended or adjusted under 35 U.S.C. 154(b) by 384 days.

(21) Appl. No.: 12/813,749

(22) Filed: Jun. 11, 2010

(65) Prior Publication Data

US 2011/0101283 A1   May 5, 2011

(30) Foreign Application Priority Data

Nov. 2, 2009 (TW) ............................... 98137073 A

(51) Int. Cl.
*H01B 1/00* (2006.01)
*H01B 1/02* (2006.01)
*H01B 1/12* (2006.01)
*H01B 1/22* (2006.01)
*B05D 5/12* (2006.01)

(52) U.S. Cl.
USPC ........... 252/500; 252/512; 252/513; 252/514; 427/126.1; 427/126.3; 427/126.4

(58) Field of Classification Search
USPC ............... 252/500, 512, 513, 514; 427/126.1, 427/126.3, 126.4
See application file for complete search history.

(56) References Cited

U.S. PATENT DOCUMENTS

| 7,026,432 | B2 | 4/2006 | Charati et al. |
| 7,060,241 | B2 | 6/2006 | Glatkowski |
| 7,062,848 | B2 | 6/2006 | Pan et al. |
| 7,115,992 | B2 | 10/2006 | Moore et al. |
| 7,291,729 | B2 | 11/2007 | Kertesz et al. |
| 7,354,988 | B2 | 4/2008 | Charati et al. |
| 7,462,656 | B2 | 12/2008 | Keulen et al. |
| 2009/0236565 | A1 * | 9/2009 | Mercx et al. ................. 252/511 |

FOREIGN PATENT DOCUMENTS

| JP | 2004-279917 A | 10/2004 |
| JP | 2005-322449 A | 11/2005 |
| JP | 2007-115875 A | 5/2007 |
| WO | 2008/045109 A2 | 4/2008 |

OTHER PUBLICATIONS

Bakes et al., "The photoelectric heating mechanism for very small graphitic grains and polycyclic aromatic hydrocarbons", The Astrophysical Journal, 427:822-838, Jun. 1, 1994.
Astorga et al., "Electrical conductivity of multiwall carbon nanotubes thin films", Optical Materials 27 (2005) 1228-1230.
Liu et al., "Multi-wall carbon nanotube as a new infrared detected material", Sensors and Actuators A 116 (2004) 394-397, Jul. 2, 2004.
Bieri et al., "Microstructuring by printing and laser curing of nanoparticle solutions", Applied Physics Letters, vol. 82, No. 20, 3529-3531, May 19, 2003.

* cited by examiner

*Primary Examiner* — Nathan M Nutter
(74) *Attorney, Agent, or Firm* — Pai Patent & Trademark Law Firm; Chao-Chang David Pai

(57) ABSTRACT

An electrically conductive composition and a fabrication method thereof are provided. The electrically conductive structure includes a major conductive material and an electrically conductive filler of an energy delivery character dispersed around the major conductive material. The method includes mixing a major conductive material with an electrically conductive filler of an energy delivery character to form a mixture, coating the mixture on a substrate, applying a second energy source to the mixture while simultaneously applying a first energy source for sintering the major conductive material to form an electrically conductive composition with a resistivity smaller than $10 \times 10^{-3} \Omega \cdot cm$.

19 Claims, 3 Drawing Sheets

ELECTRICALLY CONDUCTIVE COMPOSITION AND FABRICATION METHOD THEREOF

CROSS REFERENCE TO RELATED APPLICATIONS

This Application claims priority of Taiwan Patent Application No. 98137073, filed on Nov. 2, 2009, the entirety of which is incorporated by reference herein.

BACKGROUND OF THE INVENTION

1. Field of the Invention

The invention relates to an electrically conductive composition, and more particularly to an electrically conductive composition formed at a low temperature and a fabrication method thereof.

2. Description of the Related Art

Flexible electronic technology offers product design flexibility. The substrates and materials used for the flexible electronic technology need to be flexible. Considering the temperatures at which the flexible electronic technology fabrication processes and the flexible substrates and various flexible passive and active components can suffer, and the requirements for the flexible electronic technology of quick fabrication processes and low cost products, the flexible electronic materials need to be selected from materials that can be printed and fabricated at low temperatures.

Generally, conventional high conductivity materials used for printing are conductive metal ink, which is a conductive coating formed by high temperature sintering. Conventional conductive metal ink is usually used for rigid ceramic substrates. The other conductivity materials used for printing are polymer system metal ink which using in polymer substrate for low process temperature. The conventional conductive metal ink comprises an organic polymer, conductive metal particles and glass. In addition, a low temperature cured conductive epoxy resin or other thermosetting plastic are usually used for conventional flexible electronic materials. For high conductivity, the conventional flexible electronic conductivity materials are formed from a base curing material of polymer and an additive of sheet-shaped or high package densification conductive metal particles therein. Although the conventional flexible electronic material can be made at a temperature below 200° C., the conductivity thereof is too low and the polymer type conventional flexible electronic material is not solderable. Besides, the adhesion strength and the conductivity of the conventional flexible electronic material are easy to reduce at the high temperature of the subsequent processes.

The forming methods of the conductive metal ink are usually performed by using an additional energy to satisfy the requirements for a conductive film. Generally, the additional energy is provided from a thermal energy source to sinter the metal particles or to cure thermal cured resin for forming the conductive film. A part of the thermal energy source is taken by thermal radiation to implement energy delivery, for example taken by infrared rays, far-infrared rays or halogen lights to perform thermal radiation heating. Besides, using energy to excite molecules or atoms, or changing the energy level of the materials to produce energy, for example using a microwave heating or a laser heating methods also can achieve the effect of heating.

U.S. Pat. No. 7,026,432 discloses a high conductive ink formed from a polymer containing a metal atom and a single-walled nanometer scale carbon tube mixed with the polymer. The polymer or a polymer precursor thereof contains polyarylene ether resin, carbonyl compounds of polycarbonate, polyester or polyamide.

U.S. Pat. No. 7,062,848 discloses a printing material formed by adding purified nanometer scale materials to a liquid carrier. The nanometer scale materials in the liquid carrier have an aspect ratio of 5:1.

U.S. Pat. No. 7,060,241 discloses a transparent conductive film formed by mixing a polymer with a single-walled nanometer scale carbon tube or a dual-walled nanometer scale carbon tube. In this transparent conductive film, the single-walled nanometer scale carbon tube or the dual-walled nanometer scale carbon tube is dispersed by a small molecule dispersing agent. The polymer contains a thermal plastic resin, a thermal setting resin, elastomers and a conductive polymer.

International Patent No. WO 2008/045109A2 discloses an electromagnetic isolation material formed by mixing a nanometer scale material with a polymer. In this electromagnetic isolation material, the polymer is foamed polystyrene and the nanometer scale material is a nanometer scale carbon tube or other nanometer scale material. Moreover, a slight concentration dispersing agent is added into the electromagnetic isolation material to disperse the nanometer scale material.

Bakes, E. L. O. and Tielens, A. G. G. M. Et al. in Astrophysical Journal, Part 1 (ISSN 0004-637X), vol. 427, no. 2, p. 822-838 disclose a partial nanometer scale radiative heat transfer (RHT) produced between nanometer scale particles due to quantum effect there between.

Moreover, H. R. Astorga et al. in Optical Materials 27 (2005) 1228-1230 disclose nanometer scale material, for example a nanometer scale carbon tube has high electrical conductive ability and high thermal conductive ability. Liyue Liu and Yafei Zhang et al. in Sensors and Actuators A 116 (2004) 394-397 disclose nanometer scale carbon tubes and nanometer scale zinc oxide tubes have an absorption ability for a specific wavelength. A multi-walled nanometer scale carbon tube can be used for a new infrared light detection material. Meanwhile, nanometer scale carbon tubes have an electrical-photo character and are also useful electronic and thermal conductive material.

N. R. Bieri, J. Chung et al. at the year of 2003, in Applied Physics Letters, V82, No. 20, page 3529 disclose using a laser lighting method to sinter a gold nanometer scale particle ink, wherein the gold nanometer scale particle has a diameter of 10-100 nm. Because a nanometer scale particle with a diameter of 5 nm has an absorption ability for light of a wavelength greater than 0.6 μm, the sintering temperature for the gold nanometer scale particles can be reduced and a well conductivity thereof about $1.4 \times 10^{-7}$ Ωm can be achieved. However, the above mentioned papers and patents only use a single energy source to implement the ink sintering.

BRIEF SUMMARY OF THE INVENTION

The invention provides an electrically conductive composition. The electrically conductive composition comprises a major conductive material and an electrically conductive filler having an energy delivering ability, dispersed around the major conductive material, wherein the major conductive material consists of a plurality of electrically conductive particles, and the electrically conductive filler delivers an energy to the electrically conductive particles.

The invention further provides a method for forming an electrically conductive composition. The method comprises providing a major conductive material. Then, an electrically conductive filler is added to mix around the major conductive material to form a mixture, wherein the electrically conductive filler has an energy delivering ability for delivering energy to the major conductive material. Next, the mixture is coated on a substrate, applying a first energy source and an auxiliary second energy source to the mixture for sintering the major conductive material to form an electrically conductive composition having a resistivity smaller than $10 \times 10^{-3} \Omega \cdot cm$.

A detailed description is given in the following embodiments with reference to the accompanying drawings.

BRIEF DESCRIPTION OF THE DRAWINGS

The invention can be more fully understood by reading the subsequent detailed description and Examples with reference to the accompanying drawings, wherein.

DETAILED DESCRIPTION OF THE INVENTION

Figure 1:
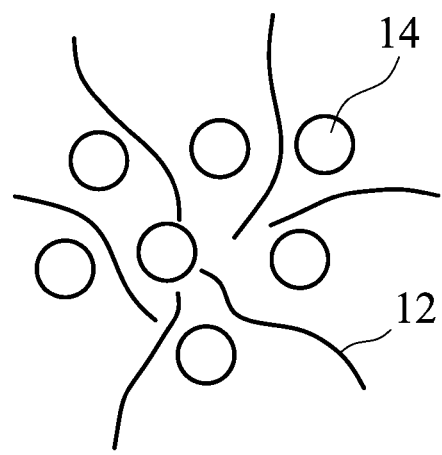
FIG. 1 shows a schematic view of a major conductive material mixing with an electrically conductive filler before forming an electrically conductive composition according to an embodiment of the invention.

The following description is of the best-contemplated mode of carrying out the invention. The description is provided for illustrating the general principles of the invention and is not meant to be limiting. The scope of the invention is best determined by reference to the appended claims.

For an electrically conductive composition formed from a major conductive material made of nanometer scale conductivity metal or metal oxide particles, a temperature range of the process of fabricating the electrically conductive composition depends on the temperature of a melting point of the nanometer scale conductivity metal or metal oxide particles corresponding to the size of the particles and the temperature of removing or decomposed a dispersing agent used for forming the electrically conductive composition. For an electrically conductive composition formed from a major conductive material which is formed by reducing a precursor of the major conductive material, a temperature range of the process for fabricating the electrically conductive composition depends on the temperature required to reducing the precursor.

Generally, the melting point of the nanometer scale particles, the decomposed temperature of the dispersing agent or the reducing temperature of the precursor and the sintering temperature of the nanometer scale particles are higher than 150° C., such that these materials can not apply to a flexible substrate of a low softening temperature.

Therefore, an embodiment of the invention provides an electrically conductive composition and a fabrication method thereof. The electrically conductive composition contains an electrically conductive filler having an energy delivering ability. The electrically conductive filler can effectively deliver an energy such as heat, light or energy wave to the surroundings of a major conductive material, such as nanometer scale electrically conductive particles or a precursor of the nanometer scale electrically conductive particles. Thus, a partial temperature of the nanometer scale electrically conductive particles of the major conductive material is increased to a temperature of the melting point of the nanometer scale electrically conductive particles, or a decomposited energy level of a dispersing agent for the nanometer scale electrically conductive particles is changed for easy decompositing of the dispersing agent, or a partial temperature of nanometer scale electrically conductive particles which are formed from reducing the precursor of the major conductive material is increased to a temperature of the melting point of the nanometer scale electrically conductive particles, and an electrically conductive composition is achieved. Moreover, by the fabrication method of the invention, a sintering temperature of the major conductive material is effectively reduced and thus the electrically conductive composition is formed at a low temperature of a background environment.

In an embodiment of the invention, the electrically conductive composition includes a major conductive material and an electrically conductive filler, having an energy delivering ability, dispersed in the major conductive material. The major conductive material may be electrically conductive particles or electrically conductive particles formed from reducing a precursor and the electrically conductive filler can deliver energy to the electrically conductive particles or the electrically conductive particles formed from reducing the precursor.

The shape of the electrically conductive particles may be a sphere, a sheet, a pillar or other shapes. The material of the electrically conductive particles may be copper, silver, gold, aluminum, titanium, nickel, tin, iron, platinum, palladium or alloys thereof. The precursor of the electrically conductive particles may be a metallo-organic compound represented by $(RCOO)_y M^{(y)}$, and wherein R is a straight-chain or a branched-chain $C_n H_{2n+1}$, n is an integral of 5-20, M is metal, which may be at lest one metal selected from the group consisting of copper, silver, gold, aluminum, titanium, nickel, tin, zinc, cadmium, iron, platinum and palladium, or the other suitable materials, and y is a valence of the metal.

The electrically conductive filler may be nanometer scale tubes, nanometer scale lines, nanometer scale spheres or combinations thereof. The nanometer scale tube is for example, a nanometer scale carbon tube, a nanometer scale metal tube or a nanometer scale non-metal tube. The nanometer scale line is for example, a nanometer scale metal line or a nanometer scale non-metal line. The nanometer scale sphere is for example, a nanometer scale carbon sphere, a nanometer scale metal sphere or a nanometer scale non-metal sphere.

The nanometer scale carbon tube may be a single-walled nanometer scale carbon tube and a multi-walled nanometer scale carbon tube. The materials of the nanometer scale metal tube, the nanometer scale metal line and the nanometer scale metal sphere may be at least one metal selected from the group consisting of titanium, manganese, zinc, copper, silver, gold, tin, iron, nickel, cobalt, indium and aluminum, or the other suitable materials. The materials of the nanometer scale non-metal tube, the nanometer scale non-metal line and the nanometer scale non-metal sphere may be titanium oxide, manganese oxide, zinc oxide, silver oxide, iron oxide, tin oxide, indium oxide, nickel oxide, cobalt oxide, aluminum oxide or the other metal oxides.

In an embodiment of the invention, a method of forming the electrically conductive composition includes dissolving or dispersing the major conductive material or the precursor of the major conductive material in a solvent. The solvent can be a polar or a non-polar solvent, for example xylene, tolene, terpineol or ethanol etc. Then, the electrically conductive filler is added to uniformly mix with the major conductive material or the precursor of the major conductive material in the solvent to form a mixture. Referring to FIG. 1, a schematic view of a major conductive material 14 mixing with an electrically conductive filler 12 before forming an electrically conductive composition according to an embodiment of the invention is shown. The major conductive material 14 is a nanometer scale electrically conductive particle and the electrically conductive filler 12 is a conductive material of nanometer scale structure, for example a nanometer scale carbon tube, which is uniformly mixed with the major conductive material 14.

Figure 2:
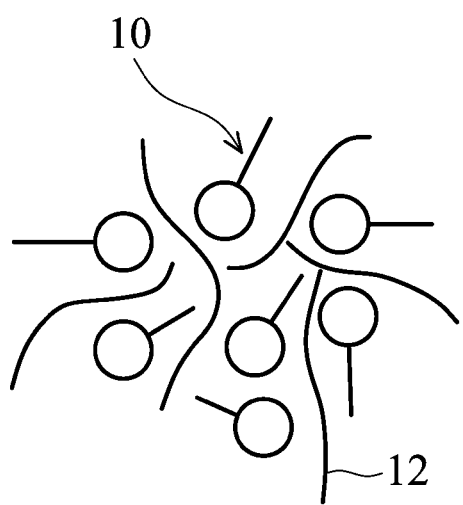
FIG. 2 shows a schematic view of a precursor of a major conductive material mixing with an electrically conductive filler before forming an electrically conductive composition according to another embodiment of the invention.

Next, referring to FIG. 2, a schematic view of a precursor 10 of a major conductive material mixing with an electrically conductive filler 12 before forming an electrically conductive composition according to another embodiment of the invention is shown. The precursor 10 of the major conductive material is a metallo-organic compound represented by $(RCOO)_y M^{(y)}$ as the above mentioned. In FIG. 2, the circle pattern represents a metal M, which is bonded to an organic functional group RCOO represented by a line pattern. The electrically conductive filler 12 is a conductive material of nanometer scale structure, for example a nanometer scale carbon tube, which is uniformly mixed with the precursor 10 of the major conductive material.

The above mentioned mixture is coated on a substrate. While applying a first energy source to the mixture, a second energy source is simultaneously applied to the mixture through an auxiliary baking system for providing an energy, wherein the energy may be a form of heat, light, energy wave or laser. The first energy source may be a temperature of 90° C. to 150° C., wherein a temperature range of the first energy source of 100° C. to 130° C. is preferred, and a temperature of about 120° C. is more preferred. In the second energy source, the heat-typed energy source may be a form of conduction heat, convection heat or radiation heat. The light-typed energy source may be a form of ultraviolet light, near-infrared light, middle-infrared light or far-infrared light. The energy wave-type energy source may be microwave with a wavelength of 300 MHz-300 GHz. The laser-typed energy source may be a gaseous laser, a solid-state laser or a liquid laser. The gaseous laser may be an excimer laser, argon ion laser, carbon dioxide ($CO_2$) laser or hydrogen-fluoride compound (HF) laser. The solid-state laser may be a diode laser, and wherein the wavelength of the diode laser includes 266 nm, 355 nm, 532 nm or 1064 nm.

The electrically conductive filler can deliver the above mentioned energy to the major conductive material or the electrically conductive particles formed from reducing the precursor, such that a partial temperature of the major conductive material or the electrically conductive particles is increased to a temperature of the melting point thereof. The electrically conductive filler also can deliver the energy to the major conductive material to reduce a decompositied energy level of a dispersing agent, for example pyridine-tri-nitrogen-hexacyclic derivatives, for the nanometer scale electrically conductive particles of the major conductive material. Therefore, the mixture of the major conductive material and the electrically conductive filler is transferred at a low temperature of the fabrication process to form a metal film with a high electrically conductivity.

Figure 3:
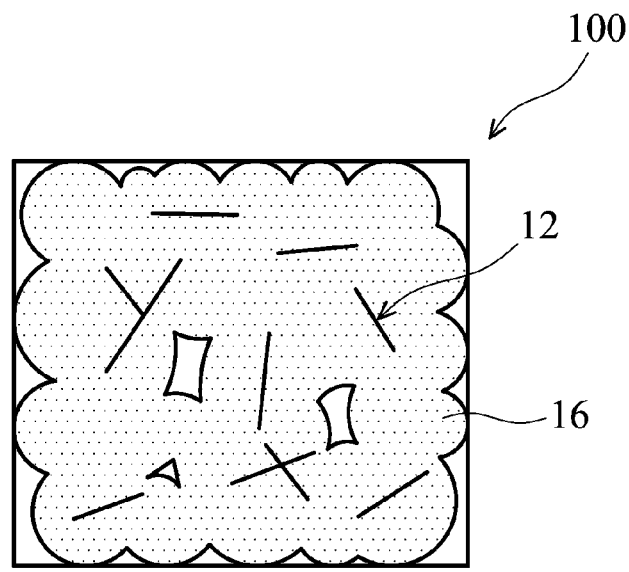
FIG. 3 shows a schematic plane view of an electrically conductive composition according to an embodiment of the invention.
Figure 4:
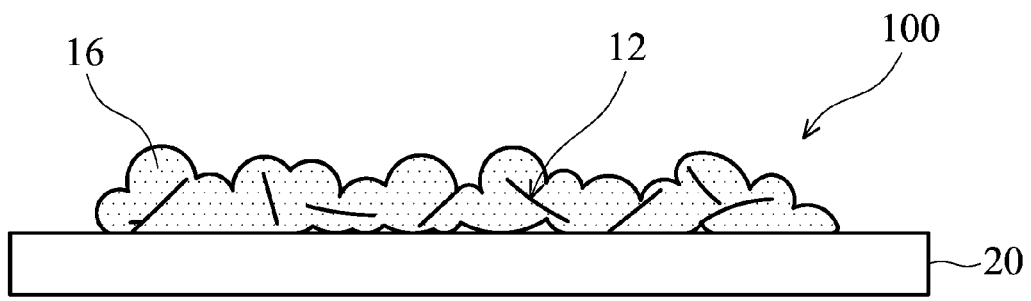
FIG. 4 shows a schematic cross section of an electrically conductive composition according to an embodiment of the invention.

Referring to FIG. 3, a schematic plane view of an electrically conductive composition 100 according to an embodiment of the invention is shown. The electrically conductive composition 100 is formed from a major conductive material 16 uniformly mixing with an electrically conductive filler 12, wherein the electrically conductive filler 12 is dispersed around the major conductive material 16. The major conductive material 16 is formed by sintering electrically conductive particles which are formed from reducing the precursor 10 or sintering the electrically conductive particles 14. Next, referring to FIG. 4, a schematic cross section of the electrically conductive composition 100 according to an embodiment of the invention is shown. The electrically conductive composition 100 may be a metal film 100 with a high conductivity and is formed on a substrate 20.

Figure 5A:
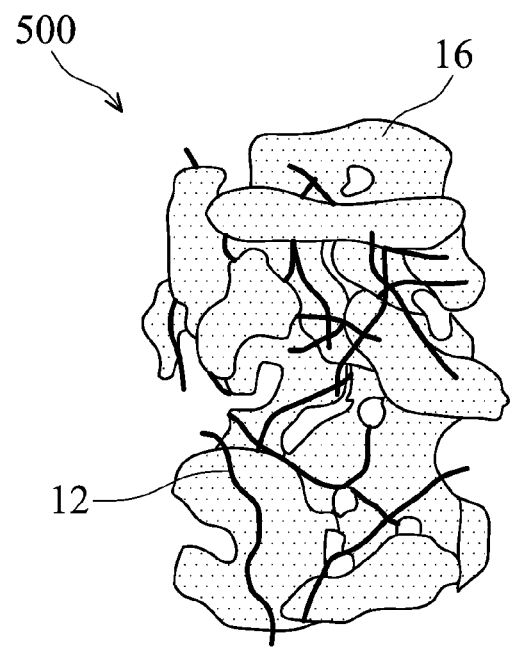
FIG. 5A shows a schematic plane view of a micro-structure of an electrically conductive composition according to an embodiment of the invention.
Figure 5B:
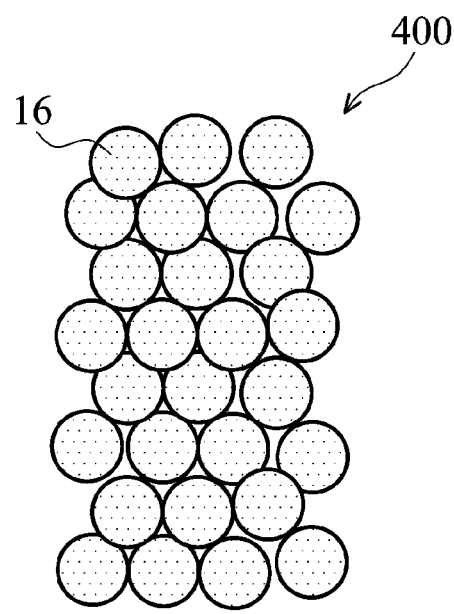
FIG. 5B shows a schematic plane view of a micro-structure of an electrically conductive composition without electrically conductive filler therein.

Then, referring to FIG. 5A, a schematic plane view of a micro-structure 500 of the electrically conductive composition 100 according to an embodiment of the invention is shown. The major conductive material 16 sintered by the auxiliary baking system (the second energy source) and near the electrically conductive filler 12 has a micro-structure as the micro-structure 500 shown in FIG. 5A, wherein the electrically conductive fillers 12 are dispersed around the major conductive material 16. The micro-structure 500 shown in FIG. 5A can be taken by a scanning electron microscope. Referring to FIG. 5B, a schematic plane view of a micro-structure 400 of an electrically conductive composition without an electrically conductive filler therein is shown. After sintering the electrically conductive material 16 without an electrically conductive filler, the electrically conductive material 16 has a micro-structure as the micro-structure 400 shown in FIG. 5B, which can be taken by a scanning electron microscope. While comparing FIG. 5A and FIG. 5B, the micro-structure 500 of the electrically conductive composition 100 according to an embodiment of the invention having the electrically conductive filler 12 dispersed around the major conductive material 16 is denser than the micro-structure 400 of the electrically conductive composition without the electrically conductive filler therein.

In an embodiment, the auxiliary baking system can provide a light with energy, such as ultraviolet light with a wavelength of 190-380 nm, a near-infrared light with a wavelength of 700-2000 nm, a middle-infrared light with a wavelength of 3000-5000 nm or a far-infrared light with a wavelength of 8000-14000 nm. In an embodiment, the auxiliary baking system can provide an energy wave, such as a microwave with a wavelength of 300 MHz-300 GHz. In an embodiment, the auxiliary baking system can provide a laser, such as a gaseous laser, a solid-state laser or a liquid laser. The gaseous laser may be excimer laser, argon ion laser, carbon dioxide ($CO_2$) laser or hydrogen-fluoride compound (HF) laser. The solid-state laser may be a diode laser with a wavelength of 266 nm, 355 nm, 532 nm or 1064 nm. The liquid laser may be a dye laser.

In an embodiment of the invention, the major conductive material can be sintered by two or more than two energy sources for auxiliary baking to form an electrically conductive composition with a resistivity smaller than $10 \times 10^{-3} \Omega \cdot cm$.

The compositions, the fabrication conditions and the conductive characters of the electrically conductive compositions of the invention are described in detail by several Examples and Comparative Examples as below:

Example 1

An organic acid silver ($C_7H_{15}COOAg$) compound of 39.8 wt % was dissolved in a solvent of xylene of 59.7 wt % and then uniformly mixed with multi-walled nanometer scale carbon tubes (MWCNT) of 0.5 wt % to form a mixture of the Example 1. Then, the mixture of the Example 1 was coated on a substrate made of polyethylene terephthalate (PET) by a spin coating process to fabricate an electrically conductive film of the Example 1. The fabrication condition of the electrically conductive film of the Example 1 was implemented by a heat process consisting of a background temperature of 120° C. and an auxiliary energy of far-infrared light to perform a sintering process.

Comparative Example 1

An organic acid silver ($C_7H_{15}COOAg$) compound of 39.8 wt % was dissolved in a solvent of xylene of 59.7 wt % to form a solution of the Comparative Example 1. Then, the solution of the Comparative Example 1 was coated on a substrate made of PET by a spin coating process to fabricate an electrically conductive film of the Comparative Example 1. The fabrication condition of the electrically conductive film of the Comparative Example 1 was implemented by a heat process consisting of a background temperature of 120° C. and an auxiliary energy of far-infrared light to perform a sintering process.

Examples 2-3

Organic acid silver ($C_7H_{15}COOAg$) compounds of 39.8 wt % and 38.1 wt % were dissolved in solvents of xylene of 59.7 wt % and 57.1 wt %, respectively, and then uniformly mixed with multi-walled nanometer scale carbon tubes of 0.5 wt % and 4.8 wt %, respectively, to form mixtures of the Examples 2-3. Then, the mixtures of the Examples 2-3 were coated on a substrate made of PET by a spin coating process to fabricate electrically conductive films of the Examples 2-3. The fabrication conditions of the electrically conductive films of the Examples 2-3 were implemented by a heat process of a background temperature of 130-150° C. to perform a sintering process. The compositions, the fabrication conditions and the sheet resistances of the electrically conductive films of the Examples 2-3 are shown in Table 1.

Comparative Examples 2-3

Organic acid silver ($C_7H_{15}COOAg$) compounds of 40 wt % and 50 wt % were dissolved in solvents of xylene of 60 wt % and 50 wt %, respectively, to form solutions of the Comparative Examples 2-3. Then, the solutions of the Comparative Examples 2-3 were coated on a substrate made of PET by a spin coating and a scrape coating processes to fabricate electrically conductive films of the Comparative Examples 2-3. The fabrication conditions of the electrically conductive films of the Comparative Examples 2-3 were implemented by a heat process of a background temperature of 130-150° C. to perform a sintering process. The compositions, the fabrication conditions and the sheet resistances of the electrically conductive films of the Comparative Examples 2-3 are shown in Table 1.

Table 1 displays the compositions, the fabrication conditions and the sheet resistances of the electrically conductive films of Examples 2-3 and Comparative Examples 2-3

|  | mixture composition before sintering | | | electrically conductive film composition | | process temperature | | |
| --- | --- | --- | --- | --- | --- | --- | --- | --- |
|  | $C_7H_{15}COOAg$ (wt %) | MW-CNT (wt %) | Xylene (wt %) | Ag (wt %) | MW-CNT (wt %) | 130° C. | 140° C. | 150° C. |
|  |  |  |  |  |  | sheet resistance ($\Omega/\square$) | | |
| Comparative Example 2 | 40 | 0 | 60 | 100 | 0 | X | 566.6M | 0.63 |
| Comparative Example 3 | 50 | 0 | 50 | 100 | 0 | 30M | 90.64K | 0.45 |
| Example 2 | 39.8 | 0.5 | 59.7 | 97 | 3 | 0.14 | 0.20 | 0.11 |
| Example 3 | 38.1 | 4.8 | 57.1 | 72 | 28 | 46.55 | 45.43 | 37.74 |

X: non-conductive

As shown in the results of Table 1, the addition of the multi-walled nanometer scale carbon tubes reduces the baking temperature need for fabricating the electrically conductive film to 130° C. However, too much addition of the multi-walled nanometer scale carbon tubes can not achieve a better conductive character.

Comparative Examples 4-7

Organic acid silver ($C_7H_{15}COOAg$) compounds of 40 wt % and 50 wt % were dissolved in solvents of tolene of 60 wt % and 50 wt %, respectively, to form solutions of the Comparative Examples 4-7. Then, the solutions of the Comparative Examples 4-7 were coated on a substrate made of PET by a spin coating process to fabricate electrically conductive films of the Comparative Examples 4-7. The fabrication conditions of the electrically conductive films of the Comparative Examples 4-7 were implemented by a heat process of a background temperature of 110-150° C. and an auxiliary energy of far-infrared light to perform a sintering process. The compositions, the fabrication conditions and the sheet resistances of the electrically conductive films of the Comparative Examples 4-7 are shown in Table 2.

Table 2 displays the compositions, the fabrication conditions and the sheet resistances of the electrically conductive films of Comparative Examples 4-7.

| | solution composition before sintering | | | electrically conductive film composition |
|---|---|---|---|---|
| | $C_7H_{15}COOAg$ (wt %) | MW-CNT (wt %) | tolene (wt %) | Ag (wt %) |
| Comparative Example 4 | 40 | 0 | 60 | 100 |
| Comparative Example 5 | 40 | 0 | 60 | 100 |
| Comparative Example 6 | 50 | 0 | 50 | 100 |
| Comparative Example 7 | 50 | 0 | 50 | 100 |

| | time of far-infrared light radiation (minutes) | background temperature | | | | |
|---|---|---|---|---|---|---|
| | | 110° C. | 120° C. | 130° C. | 140° C. | 150° C. |
| | | sheet resistance ($\Omega/\square$) | | | | |
| Comparative Example 4 | 5 | 12M | 78.40 | 0.82 | 0.09 | 0.14 |
| Comparative Example 5 | 10 | 6M | 2.63 | 0.14 | 0.09 | 0.18 |
| Comparative Example 6 | 5 | 600K | 19K | 0.90 | 3.76 | 1.27 |
| Comparative Example 7 | 10 | 4.03 | 2.08 | 1.34 | 1.99 | 0.23 |

As shown in the results of Table 2, increasing the time of far-infrared light radiation improves the conductivity of the electrically conductive films. Moreover, enhancing the background temperature also improves the conductivity of the electrically conductive films.

Examples 4-7

Organic acid silver ($C_7H_{15}COOAg$) compounds of 39.7-49.8 wt % were dissolved in solvents of tolene respectively, and then uniformly mixed with multi-walled nanometer scale carbon tubes (MWCNT) of 0.5-0.8 wt %, respectively, to form mixtures of the Examples 4-7. Then, the mixtures of the Examples 4-7 were coated on a substrate made of PET by a spin coating process to fabricate electrically conductive films of the Examples 4-7. The fabrication conditions of the electrically conductive films of the Examples 4-7 were implemented by a heat process of a background temperature of 110-150° C. and an auxiliary energy of far-infrared light to perform a sintering process. The compositions, the fabrication conditions and the sheet resistances of the electrically conductive films of the Examples 4-7 are shown in Table 3.

Table 3 displays the compositions, the fabrication conditions and the sheet resistances of the electrically conductive films of Examples 4-7.

| | solution composition before sintering | | | electrically conductive film composition | |
|---|---|---|---|---|---|
| | $C_7H_{15}COOAg$ (wt %) | MW-CNT (wt %) | tolene (wt %) | Ag (wt %) | MW-CNT (wt %) |
| Example 4 | 39.8 | 0.50 | 59.7 | 97.2 | 2.8 |
| Example 5 | 39.7 | 0.80 | 59.5 | 95.8 | 4.2 |
| Example 6 | 49.8 | 0.50 | 49.7 | 97.6 | 2.4 |
| Example 7 | 49.6 | 0.80 | 49.6 | 96.4 | 3.6 |

-continued

| | time of far-infrared light radiation (minutes) | background temperature | | | | |
|---|---|---|---|---|---|---|
| | | 110° C. | 120° C. | 130° C. | 140° C. | 150° C. |
| | | sheet resistance ($\Omega/\square$) | | | | |
| Example 4 | 5 | 4.94 | 1.00 | 0.54 | 0.42 | 0.37 |
| Example 5 | 10 | 0.59 | 0.34 | 0.39 | 0.29 | 0.32 |
| Example 6 | 5 | 6.57 | 0.19 | 0.19 | 0.16 | 0.17 |
| Example 7 | 10 | 0.24 | 0.17 | 0.17 | 0.13 | 0.13 |

As shown in the results of Table 2 and Table 3, the addition of the multi-walled nanometer scale carbon tubes improves the conductivity of the electrically conductive film at a lower background temperature. Thus, the multi-walled nanometer scale carbon tubes effectively delivering the energy provided from far-infrared light radiation to the precursor of the major conductive material, i.e. the organic acid silver ($C_7H_{15}COOAg$) compound and effectively decreasing the reducing temperature of the precursor of the major conductive material are proved.

Adhesion Tests of Examples 8-9 and Comparative Examples 8-9

The adhesions of electrically conductive films of the Examples 8-9 and the Comparative Examples 8-9 to a PET substrate were measured by a cross-cut tape test of ASTM D3330.

An organic acid silver ($C_7H_{15}COOAg$) compound of 50 g was dissolved in a solvent of xylene of 50 g, and then uniformly mixed with multi-walled nanometer scale carbon tubes (MWCNT) of 50 g to form mixtures of the Examples 8-9. Then, the mixtures of the Examples 8-9 were coated on a substrate made of PET by a spin coating process to fabricate electrically conductive films of the Examples 8-9. The fabrication condition of the electrically conductive film of the Example 8 was implemented by a heat process with a background temperature of 120° C. for 10 minutes to perform a sintering process. The fabrication condition of the electrically conductive film of Example 9 was implemented by a heat process with a background temperature of 120° C. for 10 minutes and an auxiliary energy of far-infrared light to perform a sintering process.

The fabrication conditions of the electrically conductive films of the Comparative Examples 8-9 were the same as that of the Examples 8-9. The difference between the Comparative Examples 8-9 and the Examples 8-9 was the compositions of the electrically conductive films of the Comparative Examples 8-9 without addition of multi walled nanometer scale carbon tubes. The compositions, the fabrication conditions and the adhesion test results of the Comparative Examples 8-9 and the Examples 8-9 are shown in Table 4.

Table 4 displays the compositions, the fabrication conditions and the adhesion test results of the electrically conductive films of Comparative Examples 8-9 and Examples 8-9.

|  | solution composition before sintering | | | electrically conductive film composition | |
| --- | --- | --- | --- | --- | --- |
|  | $C_7H_{15}COOAg$ (g) | MW-CNT (g) | xylene (g) | Ag (wt %) | MW-CNT (wt %) |
| Example 8 | 50 | 0.5 | 50 | 97.6 | 2.4 |
| Example 9 | 50 | 0.5 | 50 | 97.6 | 2.4 |
| Comparative Example 8 | 50 | 0 | 50 | 100 | 0 |
| Comparative Example 9 | 50 | 0 | 50 | 100 | 0 |

|  | fabrication condition A: 120° C. for sintering 10 minutes B: auxiliary far-infrared light for sintering | adhesion test result |
| --- | --- | --- |
| Example 8 | A | 1B |
| Example 9 | A + B | 4B |
| Comparative Example 8 | A | 0B |
| Comparative Example 9 | A + B | 1B |

0B: worst adhesion; 4B: best adhesion

As shown in the results of Table 4, the addition of the multi-walled nanometer scale carbon tubes enhances the adhesion of the electrically conductive film to the substrate. Moreover, applying the auxiliary far-infrared light radiation for sintering further improves the adhesion of the electrically conductive film to the substrate.

Examples 10-11

An organic acid silver ($C_7H_{15}COOAg$) compound of 50 g was dissolved in a solvent of xylene of 50 g, and then uniformly mixed with nanometer scale carbon spheres (with a diameter of 5-15 nm, product of Advance Nanopower INC.) of 0.1 g and 0.3 g, respectively, to form mixtures of the Examples 10-11. Then, the mixtures of the Examples 10-11 were coated on a glass substrate by a spin coating process to fabricate electrically conductive films of the Examples 10-11. The fabrication conditions of the electrically conductive films of the Examples 10-11 were implemented by a heat process of a background temperature of 100-130° C. and an auxiliary far-infrared light radiation to perform a sintering process.

Comparative Examples 10-11

An organic acid silver ($C_7H_{15}COOAg$) compound of 50 g was dissolved in a solvent of xylene of 50 g, and then uniformly mixed with nanometer scale carbon spheres (with a diameter of 5-15 nm, product of Advance Nanopower INC.) of 0.1 g and 0.3 g, respectively, to form mixtures of the Comparative Examples 10-11. Then, the mixtures of the Comparative Examples 10-11 were coated on a glass substrate by a spin coating process to fabricate electrically conductive films of the Comparative Examples 10-11. The fabrication conditions of the electrically conductive films of the Comparative Examples 10-11 were implemented by a heat process of a background temperature of 100-130° C. to perform a sintering process.

The compositions, the fabrication conditions and the sheet resistances of the electrically conductive films of the Comparative Examples 10-11 and the Examples 10-11 are shown in Table 5.

Table 5 displays the compositions, the fabrication conditions and the sheet resistances of the electrically conductive films of Examples 10-11 and Comparative Examples 10-11.

|  | mixture composition before sintering | | | electrically conductive film composition | |
| --- | --- | --- | --- | --- | --- |
|  | $C_7H_{15}COOAg$ (g) | nanometer scale carbon spheres (g) | xylene (g) | Ag (g) | nanometer scale carbon spheres (g) |
| Comparative Example 10 | 50 | 0.1 | 50 | 21 | 0.1 |
| Comparative Example 11 | 50 | 0.3 | 50 | 21 | 0.3 |
| Example 10 | 50 | 0.1 | 50 | 21 | 0.1 |
| Example 11 | 50 | 0.3 | 50 | 21 | 0.3 |

|  | auxiliary far-infrared light for sintering | background temperature | | | |
| --- | --- | --- | --- | --- | --- |
|  |  | 100° C. | 110° C. | 120° C. | 130° C. |
|  |  | sheet resistance ($\Omega/\square$) | | | |
| Comparative Example 10 | none | X | X | X | 31.72K |
| Comparative Example 11 | none | X | X | X | 1.76 |
| Example 10 | done | X | 11.38 | 0.53 | 0.32 |
| Example 11 | done | 54.38 | 7.89 | 1.69 | 0.64 |

X: non-conductive

As shown in the results of Table 5, the addition of the nanometer scale carbon spheres improves the conductive character of the electrically conductive film under fabrication conditions of low background temperatures and applying an auxiliary energy.

Example 12

An organic acid silver ($C_7H_{15}COOAg$) compound of 50 g was dissolved in a solvent of xylene of 50 g, and then uniformly mixed with nanometer scale non-metal zinc oxide tubes of 0.1 g to form a mixture of the Example 12. Then, the mixture of the Example 12 was coated on a glass substrate by a spin coating process to fabricate an electrically conductive film of the Example 12. The fabrication condition of the electrically conductive film of the Example 12 was implemented by a heat process of a background temperature of 100° C. and 120° C. and an auxiliary far-infrared light radiation to perform a sintering process.

Comparative Example 12

An organic acid silver ($C_7H_{15}COOAg$) compound of 50 g was dissolved in a solvent of xylene of 50 g, and then uniformly mixed with nanometer scale non-metal zinc oxide tubes of 0.1 g to form a mixture of the Comparative Example 12. Then, the mixture of the Comparative Example 12 was coated on a glass substrate by a spin coating process to fabricate an electrically conductive film of the Comparative Example 12. The fabrication condition of the electrically conductive film of the Comparative Example 12 was implemented by a heat process of a background temperature of 100° C. and 120° C. to perform a sintering process.

The compositions, the fabrication conditions and the sheet resistances of the electrically conductive films of the Comparative Example 12 and the Example 12 are shown in Table 6.

Table 6 displays the compositions, the fabrication conditions and the sheet resistances of the electrically conductive films of Example 12 and Comparative Example 12.

As shown in the results of Table 6, the addition of the nanometer scale zinc oxide tubes improves the conductive character of the electrically conductive film under the fabrication condition of a low background temperature and applying an auxiliary energy while comparing to the fabrication condition without applying the auxiliary energy.

Example 13

An organic acid silver ($C_7H_{15}COOAg$) compound of 40 wt % was dissolved in a solvent of xylene of 50 wt %, and then uniformly mixed with nanometer scale copper particles (with a diameter of 30 nm) of 10 wt % to form a mixture of the Example 13. Then, the mixture of the Example 13 was coated on a glass substrate by a spin coating process to fabricate an electrically conductive film of the Example 13. The fabrication condition of the electrically conductive film of the Example 13 was implemented by a heat process of a background temperature of 100° C.-150° C. and an auxiliary far-infrared light radiation to perform a sintering process.

Comparative Example 13

An organic acid silver ($C_7H_{15}COOAg$) compound of 40 wt % was dissolved in a solvent of xylene of 50 wt %, and then uniformly mixed with nanometer scale copper particles (with a diameter of 30 nm) of 10 wt % to form a mixture of the Comparative Example 13. Then, the mixture of the Comparative Example 13 was coated on a glass substrate by a spin coating process to fabricate an electrically conductive film of the Comparative Example 13. The fabrication condition of the electrically conductive film of the Comparative Example 13 was implemented by a heat process of a background temperature of 100° C.-150° C. to perform a sintering process.

The compositions, the fabrication conditions and the sheet resistances of the electrically conductive films of the Comparative Example 13 and the Example 13 are shown in Table 7.

Table 7 displays the compositions, the fabrication conditions and the sheet resistances of the electrically conductive films of Example 13 and Comparative Example 13.

| | mixture composition before sintering | | | electrically conductive film composition | | | background temperature | |
|---|---|---|---|---|---|---|---|---|
| | $C_7H_{15}COOAg$ (g) | nanometer scale zinc oxide tubes (g) | xylene (g) | Ag (g) | nanometer scale zinc oxide tubes (g) | auxiliary far-infrared light for sintering | 100° C. sheet resistance (Ω/□) | 120° C. sheet resistance (Ω/□) |
| Comparative Example 12 | 50 | 0.1 | 50 | 21 | 0.1 | none | X | X |
| Example 12 | 50 | 0.1 | 50 | 21 | 0.1 | done | 200M | 0.56 |

X: non-conductive

| | mixture composition before sintering | | | electrically conductive film composition | |
|---|---|---|---|---|---|
| | $C_7H_{15}COOAg$ (wt %) | nanometer scale copper particles (wt %) | xylene (wt %) | Ag (wt %) | nanometer scale copper particles (wt %) |
| Comparative Example 13 | 40 | 10 | 50 | 52.4 | 47.6 |
| Example 13 | 40 | 10 | 50 | 52.4 | 47.6 |

| | auxiliary far-infrared light for sintering | background temperature | | | |
|---|---|---|---|---|---|
| | | 100° C. | 120° C. | 130° C. | 150° C. |
| | | sheet resistance ($\Omega/\square$) | | | |
| Comparative Example 13 | none | X | X | X | 0.63 |
| Example 13 | done | 1M | 0.17 | 0.05 | 0.02 |

X: non-conductive

As shown in the results of Table 7, the addition of the nanometer scale copper particles improves the conductive character of the electrically conductive film under the fabrication conditions of a low background temperature while applying an auxiliary energy. This method produces superior results compared to fabrication conditions when auxiliary energy is not applied.

Example 14

An organic acid silver ($C_7H_{15}COOAg$) compound of 40 wt % was dissolved in a solvent of xylene of 50 wt %, and then uniformly mixed with nanometer scale silver particles (with a diameter of 30 nm) of 10 wt % to form a mixture of the Example 14. Then, the mixture of the Example 14 was coated on a glass substrate by a spin coating process to fabricate an electrically conductive film of the Example 14. The fabrication condition of the electrically conductive film of the Example 14 was implemented by a heat process of a background temperature of 100° C. and 120° C. and an auxiliary far-infrared light radiation to perform a sintering process.

Comparative Example 14

An organic acid silver ($C_7H_{15}COOAg$) compound of 40 wt % was dissolved in a solvent of xylene of 50 wt %, and then uniformly mixed with nanometer scale silver particles (with a diameter of 30 nm) of 10 wt % to form a mixture of the Comparative Example 14. Then, the mixture of the Comparative Example 14 was coated on a glass substrate by a spin coating process to fabricate an electrically conductive film of the Comparative Example 14. The fabrication condition of the electrically conductive film of the Comparative Example 14 was implemented by a heat process of a background temperature of 100° C. and 120° C. to perform a sintering process.

The compositions, the fabrication conditions and the sheet resistances of the electrically conductive films of the Comparative Example 14 and the Example 14 are shown in Table 8.

Table 8 displays the compositions, the fabrication conditions and the sheet resistances of the electrically conductive films of Example 14 and Comparative Example 14.

| | mixture composition before sintering | | | electrically conductive film composition | auxiliary far-infrared light for sintering | background temperature | |
|---|---|---|---|---|---|---|---|
| | $C_7H_{15}COOAg$ (wt %) | nanometer scale silver particles (wt %) | xylene (wt %) | Ag (wt %) | | 100° C. sheet resistance ($\Omega/\square$) | 120° C. |
| Comparative Example 14 | 40 | 10 | 50 | 100 | none | X | X |
| Example 14 | 40 | 10 | 50 | 100 | done | X | 0.04 |

X: non-conductive

As shown in the results of Table 8, the addition of the nanometer scale silver particles improves the conductive character of the electrically conductive film under the fabrication conditions of a low background temperature and application of an auxiliary energy compared to the fabrication condition without applying the auxiliary energy.

Example 15

An ink of 99.5 wt % formed from dispersing 20 wt % of nanometer scale copper particles (with a diameter of 30 nm) in alcohol was then uniformly mixed with nanometer scale carbon tubes of 0.5 wt % to form a mixture of the Example 15. Then, the mixture of the Example 15 was coated on a glass substrate by a spin coating process to fabricate an electrically conductive film of the Example 15. The fabrication condition of the electrically conductive film of the Example 15 was implemented by a heat process of a background temperature of 100° C.-150° C. and an auxiliary far-infrared light radiation to perform a sintering process.

Comparative Example 15

An ink of 99.5 wt % formed from dispersing 20 wt % of nanometer scale copper particles (with a diameter of 30 nm) in alcohol and was then uniformly mixed with nanometer scale carbon tubes of 0.5 wt % to form a mixture of the Comparative Example 15. Then, the mixture of the Comparative Example 15 was coated on a glass substrate by a spin coating process to fabricate an electrically conductive film of the Comparative Example 15. The fabrication condition of the electrically conductive film of the Comparative Example 15 was implemented by a heat process of a background temperature of 100° C.-150° C. to perform a sintering process.

The compositions, the fabrication conditions and the sheet resistances of the electrically conductive films of the Comparative Example 15 and the Example 15 are shown in Table 9.

Table 9 displays the compositions, the fabrication conditions and the sheet resistances of the electrically conductive films of Example 15 and Comparative Example 15.

filler to form the electrically conductive composition can improve the conductive character of the electrically conductive film under the fabrication conditions of a low background temperature while applying an auxiliary energy. This method produces superior results compared to the fabrication process without applying the auxiliary energy.

Example 16

An ink of 99.5 wt % formed from dispersing 20 wt % of nanometer scale silver particles (with a diameter of 30 nm) in alcohol was uniformly mixed with nanometer scale carbon tubes of 0.5 wt % to form a mixture of the Example 16. Then, the mixture of the Example 16 was coated on a glass substrate by a spin coating process to fabricate an electrically conductive film, shown in Example 16. The fabrication condition of the electrically conductive film of Example 16 was implemented by a heat process using a background temperature of 100° C.-150° C. while applying auxiliary far-infrared light radiation to perform a sintering process.

Comparative Example 16

An ink of 99.5 wt % formed from dispersing 20 wt % of nanometer scale silver particles (with a diameter of 30 nm) in alcohol was uniformly mixed with nanometer scale carbon tubes of 0.5 wt % to form a mixture of the Comparative Example 16. Then, the mixture of the Comparative Example 16 was coated on a glass substrate by a spin coating process to fabricate an electrically conductive film of the Comparative Example 16. The fabrication condition of the electrically conductive film of the Comparative Example 16 was implemented by a heat process of a background temperature of 100° C.-150° C. to perform a sintering process.

The compositions, the fabrication conditions and the sheet resistances of the electrically conductive films of the Comparative Example 16 and the Example 16 are shown in Table 10.

| | mixture composition before sintering | | electrically conductive film composition | | | background temperature | | |
|---|---|---|---|---|---|---|---|---|
| | nanometer scale copper particles (wt %) | nanometer scale carbon tubes (wt %) | Cu (wt %) | nanometer scale carbon tubes (wt %) | auxiliary far-infrared light for sintering | 100° C. | 120° C. sheet resistance (Ω/□) | 150° C. |
| Comparative Example 15 | 99.5 | 0.5 | 97.5 | 2.45 | none | X | 16K | 9K |
| Example 15 | 99.5 | 0.5 | 97.5 | 2.45 | done | X | 7K | 3K |

X: non-conductive

As shown in the results of Table 9, using nanometer scale copper particles as the major conductive material and using nanometer scale carbon tubes as the electrically conductive Table 10 displays the compositions, the fabrication conditions and the sheet resistances of the electrically conductive films of Example 16 and Comparative Example 16.

| | mixture composition before sintering | | electrically conductive film composition | | background temperature | | |
|---|---|---|---|---|---|---|---|
| | nanometer scale silver particles (wt %) | nanometer scale carbon tubes (wt %) | Cu (wt %) | nanometer scale carbon tubes (wt %) | auxiliary far-infrared light for sintering | 100° C. | 120° C. sheet resistance (Ω/□) | 150° C. |
| Comparative Example 16 | 99.5 | 0.5 | 97.5 | 2.45 | none | X | X | 5K |
| Example 16 | 99.5 | 0.5 | 97.5 | 2.45 | done | X | 15.3K | 6K |

X: non-conductive

As shown in the results of Table 10, using nanometer scale silver particles as the major conductive material and using nanometer scale carbon tubes as the electrically conductive filler to form the electrically conductive composition can improve the conductive character of the electrically conductive film under the fabrication conditions of a low background temperature and applying an auxiliary energy while comparing to the fabrication condition without applying the auxiliary energy.

Examples 17-20

85 wt % of silver particles with a diameter of 1.5 μm was mixed with a colloid formed from dissolving an organic acid silver ($C_7H_{15}COOAg$) compound of 40 wt % in a solvent of xylene of 60 wt %, and then uniformly mixed with nanometer scale carbon tubes of 0-0.5 wt %, respectively, to form electrically conductive inks of the Examples 17-20. Then, the electrically conductive inks of the Examples 17-20 were coated on a glass substrate by a screen printing process to fabricate spiral circuits with a length of 215 cm, a width of 0.8 mm and a thickness of 20-40 μm of the Examples 17-20. The electrically conductive inks of spiral circuits of the Examples 17-20 were baked at a background temperature of 120° C. and further applying an auxiliary far-infrared light radiation to perform a sintering process. The spiral circuits of the Examples 17-20 were measured by a 4-point probe to obtain resistances thereof and further to calculate volume resistivities thereof.

Comparative Examples 17-20

85 wt % of silver particles with a diameter of 1.5 μm was mixed with a colloid formed from dissolving an organic acid silver ($C_7H_{15}COOAg$) compound of 40 wt % in a solvent of xylene of 60 wt %, and then uniformly mixed with nanometer scale carbon tubes of 0-0.5 wt %, respectively, to form electrically conductive inks of the Comparative Examples 17-20. Then, the electrically conductive inks of the Comparative Examples 17-20 were coated on a glass substrate by a screen printing process to fabricate spiral circuits with a length of 215 cm, a width of 0.8 mm and a thickness of 20-40 μm of the Comparative Examples 17-20. The electrically conductive inks of spiral circuits of the Examples 17-20 were baked at a background temperature of 120° C. to perform a sintering process. The spiral circuits of the Comparative Examples 17-20 were measured by a 4-point probe to obtain resistances thereof and further to calculate volume resistivities thereof.

The compositions, the fabrication conditions and the volume resistivities of the spiral circuits of the Comparative Examples 17-20 and the Examples 17-20 are shown in Table 11.

Table 11 displays the electrically conductive ink compositions, the fabrication conditions and the volume resistivities of the spiral circuits of Examples 17-20 and Comparative Examples 17-20.

| | silver particles (wt %) | $C_7H_{15}COOAg$ (wt %) | nanometer scale carbon tubes (wt %) | xylene (wt %) | fabrication condition A: baking at background temperature B: auxiliary far-infrared light radiation | volume resistivity (μΩ · cm) |
|---|---|---|---|---|---|---|
| Example 17 | 85 | 6 | 0 | 9 | A + B | 9.50 |
| Example 18 | 84.9 | 6 | 0.1 | 9 | A + B | 8.71 |
| Example 19 | 84.7 | 6 | 0.3 | 9 | A + B | 9.05 |
| Example 20 | 84.5 | 6 | 0.5 | 9 | A + B | 9.03 |
| Comparative Example 17 | 85 | 6 | 0 | 9 | A | 76.89 |
| Comparative Example 18 | 84.9 | 6 | 0.1 | 9 | A | 65.38 |
| Comparative Example 19 | 84.7 | 6 | 0.3 | 9 | A | 69.96 |
| Comparative Example 20 | 84.5 | 6 | 0.5 | 9 | A | 158.01 |

As shown in the results of Table 11, after baking the electrically conductive inks at a background temperature and simultaneously applying an auxiliary far-infrared light radiation to the electrically conductive inks to form the spiral circuits, the volume resistivities of the spiral circuits of the Examples are lower than that Comparative Examples. Moreover, the addition of nanometer scale carbon tubes as the electrically conductive filler of the electrically conductive compositions and the application of an auxiliary far-infrared light radiation to the electrically conductive inks can help to reduce the volume resistivities of the spiral circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically conductive composition, comprising:
a major conductive material; and
an electrically conductive filler, having an energy delivering ability for delivering an energy provided from an auxiliary energy source to the major conductive material, dispersed around the major conductive material, wherein the major conductive material is 65 to 99.9 percent by weight and consists of a plurality of electrically conductive particles, and the electrically conductive filler is 0.1 to 35 percent by weight, and wherein the electrically conductive particles of the major conductive material are sintered together.

2. The electrically conductive composition as claimed in claim 1, wherein the auxiliary energy source comprises heat, light, microwave with a wavelength of 300MHz-300GHz or laser.

3. The electrically conductive composition as claimed in claim 1, wherein the major conductive material is 75 to 99.9 percent by weight and the electrically conductive filler is 0.1 to 25 percent by weight.

4. The electrically conductive composition as claimed in claim 1, wherein the electrically conductive particle is a metal electrically conductive particle or a non-metal electrically conductive particle.

5. The electrically conductive composition as claimed in claim 4, wherein the electrically conductive particle is a metal electrically conductive particle selected from the group consisting of copper, silver, gold, aluminum, titanium, nickel, tin, iron, platinum and palladium.

6. The electrically conductive composition as claimed in claim 4, wherein the electrically conductive particle is a non-metal electrically conductive particle selected from the group consisting of an electrically conductive oxide, an electrically conductive nitride, an electrically conductive doped oxide and an electrically conductive oxide complex.

7. The electrically conductive composition as claimed in claim 6, wherein the non-metal electrically conductive particle is an electrically conductive oxide selected from the group consisting of indium oxide ($In_2O_3$), tin oxide ($SnO_2$), zinc oxide (ZnO) and cadmium oxide (CdO).

8. The electrically conductive composition as claimed in claim 6, wherein the non-metal electrically conductive particle is an electrically conductive nitride comprising titanium nitride (TiN).

9. The electrically conductive composition as claimed in claim 6, wherein the non-metal electrically conductive particle is an electrically conductive doped oxide selected from the group consisting of tin doped indium oxide ($Sn:In_2O_3$), indium doped zinc oxide (In:ZnO), cadmium doped zinc oxide (Cd:ZnO), aluminum doped zinc oxide (Al:ZnO), fluorine doped tin oxide ($F:SnO_2$) and tantalum doped titanium oxide ($Ta:TiO_2$).

10. The electrically conductive composition as claimed in claim 6, wherein the non-metal electrically conductive particle is an electrically conductive oxide complex selected from the group consisting of an indium oxide-zinc oxide complex, a cadmium-indium oxide complex ($CdIn_2O_4$), a cadmium-tin oxide complex ($Cd_2SnO_4$) and a zinc-tin oxide complex ($Zn_2SnO_4$).

11. The electrically conductive composition as claimed in claim 1, wherein the shape of the electrically conductive particle comprises a sphere or a sheet, and wherein the sheet-shaped electrically conductive particle has an aspect ratio smaller than 2 or equal to 2.

12. The electrically conductive composition as claimed in claim 1, wherein the electrically conductive particle comprises an electrically conductive particle formed from reducing a precursor, and wherein the precursor comprises a metallo-organic compound represented by $(RCOO)_y M^{(y)}$, and wherein R is a straight-chain or a branched-chain $C_n H_{2n+1}$, n is an integer of 5-20, M is metal, selected from the group consisting of copper, silver, gold, aluminum, titanium, nickel, tin, zinc, cadmium, iron, platinum and palladium, and y is a valence of the metal.

13. The electrically conductive composition as claimed in claim 1, wherein the electrically conductive filler is selected from the group consisting of a nanometer scale tube, a nanometer scale line and a nanometer scale sphere.

14. The electrically conductive composition as claimed in claim 13, wherein the electrically conductive filler is a nanometer scale tube selected from the group consisting of a nanometer scale carbon tube, a nanometer scale metal tube and a nanometer scale non-metal tube.

15. The electrically conductive composition as claimed in claim 13, wherein the nanometer scale tube is a nanometer scale non-metal tube selected from the group consisting of titanium oxide, manganese oxide, zinc oxide, silver oxide, iron oxide, tin oxide, indium oxide and nickel oxide.

16. The electrically conductive composition as claimed in claim 13, wherein the electrically conductive filler is a nanometer scale line selected from the group consisting of a nanometer scale metal line and a nanometer scale non-metal line.

17. A method for forming an electrically conductive composition, comprising:
providing a major conductive material;
adding an electrically conductive filler mixing with the major conductive material to form a mixture; and
coating a substrate with the mixture, applying a first energy source and a second energy source to the mixture for sintering the major conductive material to form an electrically conductive composition having a resistivity smaller than $10 \times 10^{-3} \Omega \cdot cm$, wherein the electrically conductive filler has an energy delivering ability for delivering an energy provided from the first energy source and the second energy source to the major conductive material.

18. The method as claimed in claim 17, wherein the first energy source has a temperature range between 90° C. and 150°C.

19. The method as claimed in claim 17, wherein the first energy source and the second energy source are selected from the group consisting of heat, light, energy wave and laser, and wherein the first energy source is different from the second energy source.

* * * * *